March 29, 1938. H. E. DRENNAN 2,112,335
APPARATUS FOR TREATING HYDROCARBON FLUIDS
Filed Oct. 8, 1934
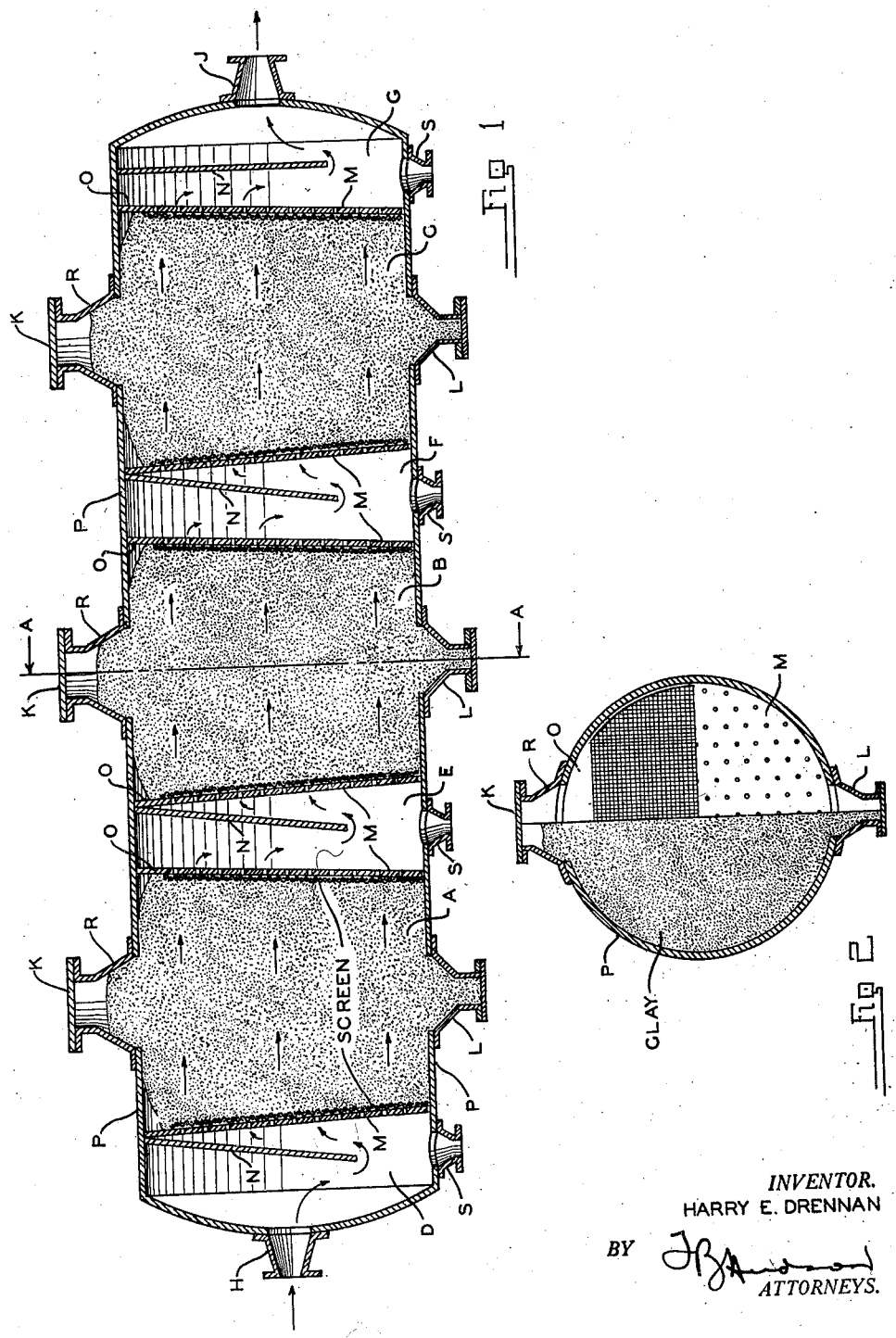
*INVENTOR.*
HARRY E. DRENNAN
BY
*ATTORNEYS.*

Patented Mar. 29, 1938

2,112,335

UNITED STATES PATENT OFFICE 2,112,335

APPARATUS FOR TREATING HYDROCARBON FLUIDS

Harry E. Drennan, Bartlesville, Okla., assignor to Phillips Petroleum Company, Bartlesville, Okla., a corporation of Delaware Application October 8, 1934, Serial No. 747,462

4 Claims. (Cl. 196—96)

This invention relates to the treatment of hydrocarbon fluids and more particularly refers to an improved apparatus for the refining of hydrocarbon distillates by treatment of vapors with polymerizing material to improve their quality.

Vapor-phase treatment of hydrocarbon distillates to improve their quality particularly with respect to gum content, color, odor and stability is now well recognized in the oil refining industry. In a widely known method of treating hydrocarbon distillates in the vapor phase, the vapors to be treated are passed downward through a bed of treating or polymerizing material such as contact clay, diatomaceous earth, fuller's earth, and the like. Polymers formed therein, together with any condensed material, flow downward from the points from which they are formed to the bottom of the bed of treating material. The liquid polymers and condensate are then separated from the treated vapors by gravity. The treated vapors are passed through a knockout drum or tower wherein any entrained polymers are removed, the polymer-free vapors being condensed and collected. The polymers and liquid condensate pass to a polymer receiver, from which they may be returned to the system.

Due to the fact that the refining action of the treating material upon the hydrocarbon vapors is essentially a surface phenomenon, the presence of polymerized products prevents contact between vapors and treating material to a considerable extent and thereby greatly reduces the efficiency of the treating material. This is especially true in the usual method of treatment, where the polymerizing material in the lower part of the treating tower is subjected to contact with a continuous stream of polymerized products formed in the upper portion of said tower. The heavy polymerized products passing over the treating material in the lower portion of the tower, block the minute pores and cover the surface of this material to such an extent that it is rendered practically inactive. Furthermore, the effect is cumulative, so that the vapors as they flow downward instead of coming in contact with more active material, they are met by treating material which is constantly becoming more and more inert.

The methods of treating vapors in a horizontal treater have not been successful because the vapors channel in the upper portion of the chamber, even if baffles are used, due to the packing effect of the treating material, and, the liquid polymers which gravitate to the lower portion of the chamber. The compacted material in the lower portion of the chamber offers more resistance to the flow of gases than the looser material in the upper portion of the chamber. As a result the gases channel through the upper portion of the chamber. The polymers formed tend to gravitate downward but at the same time they are carried forward by the horizontal flow of the vapors, so that the lower half of a long chamber is more or less saturated with condensate and liquid polymers which offer resistance to the flow of vapors. As a result, since the vapors follow the path of least resistance, they channel through the upper portion of the treating material. Horizontal treaters, for this reason, have not been efficient.

The present invention provides an apparatus for treating hydrocarbons whereby vapors flowing horizontally through treating material will be maintained equally distributed throughout, and the surface of the treating material will be maintained substantially free of polymers, thereby greatly improving its efficiency.

One improvement provided by the present invention comprises passing a hydrocarbon fluid such as cracked distillate, in a heated vaporous state, in a substantially horizontal direction through a series of two or more beds or chambers of clay, fuller's earth, or other decolorizing material. These series of beds of treating material may be arranged in various positions. They may be superimposed one above the other, or arranged concentrically, or in a horizontal position. The chambers may be adjacent, or separated from each other in various ways in the same or different towers. The size and shape of the chambers is optional and will be determined by the volume of vapors to be treated. It is advantageous to have the length of the chamber in the direction of flow of vapors less than either of the other dimensions. This enables the polymers to be quickly carried out of the treating material into the vapor space where they are collected and trapped out of the treater.

The resistance to flow of the gases through the treating material in the chamber may be equalized in various ways. One method is to set the screens at an angle decreasing the thickness of the bed at the bottom and increasing the thickness at the top in the direction of flow, thus equalizing the resistance of flow throughout the chamber. The screen angle may be determined experimentally by inserting Pitot tubes in the clay, one near the top and another near the bottom of an experimental chamber and conducting test under plant conditions as to pressure and ratio of gas to cross section of treating material. When screens are adjusted so that Pitot tubes register same flow pressure, the flow is equalized. Baffles, mentioned below, are adjusted the same way.

Another means of equalizing the distribution or flow of gas through the chamber is as follows:

Baffles may be arranged in the vapor spaces in front or back of the screens in such a position that they will offer a graduated increase in resistance from bottom toward top to the vapors just before entering the treating material so that any path the vapors may take through the chamber, the total resistance, which is the baffle resistance plus the resistance of the treating material, will be the same. This will insure equal distribution of the flow of gases through the chamber. These baffles will also aid in removing entrained polymers from the vapors.

It is obvious, by this improved method of arranging the treating material in a series of relatively small chambers, that the polymers may be readily separated from same, thereby maintaining the treating material in a high state of activity, also, by maintaining equal flow of vapors throughout the chamber intimate contact of treating material and vapors is obtained which is not possible by the down flow method or by other horzontal flow methods. Further, extended contact with the adsorbent is possible at high rates of flow without the use of adsorbent beds of excessive height and consequent high pressures and destructive mechanical stresses in the lower part of the bed of adsorbent.

The attached diagrammatic drawing illustrates a suitable form of apparatus in which the process of the present invention may be carried out:

Figure 1 is a cross sectional side elevation of a horizontal tower comprising a plurality of treating chambers separated by vapor spaces.

Figure 2 is a cross section of the horizontal tower in Fig. 1.

Referring more in detail to the drawing: Figure 1 is a tank or tower positioned horizontally. It is divided by perforated plates M into three chambers A, B, and C for treating material and four chambers D, E, F, and G for vapors. The top portion of plate M designated by O is not perforated and serves as baffles to prevent the vapors from short circuiting between vapor chambers, as for example, from D to E. The perforated plates M are set at such an angle that the chambers A, B, and C increase in length from the bottom toward the top. The baffles N are set at a predetermined angle and are an alternative means of equalizing the flow of gases through the treating chamber. They are set at such an angle that they will offer an increasing resistance, from top to bottom, to the vapors just before entering the treating material. They also serve to knock down entrained liquid polymers.

A cone shape dome R is built on and above each chamber, large enough to hold about 5% as much treating material as the chamber below it as A, to make up for settling of treating material. K is a manhole for charging the treating material to the chamber. L is a manhole for removing spent material from same. The liquid polymers are trapped off through S, by means not shown but which are known to the art.

In carrying out the present invention in the apparatus shown in Fig. 1, the vapors to be treated may be introduced through pipe H into vapor space D, passed through perforated plate and screen M into and through treating material in chamber A into vapor space E. Any liquid polymers formed in the treating material are caused to flow forward by the vapors into vapor space E where it is collected and trapped out. The baffles N may serve a double purpose: Knock down entrained polymers and aid in the distribution of the flow of vapors through the treating material. The vapors in chamber E pass under baffle N and through the screen M into and through the treating material in chamber B into vapor space F. Here as in E the polymers are collected and trapped out. In the same manner the vapors flow through the treating material in chamber C on into vapor space G thence out of the treater through J. Polymers are formed in each bed of treating material until the vapors are purified. Removing the polymers from each chamber as soon as formed prolongs the life of the treating material.

The vapors are intimately contacted with the treating material in chambers A, B, and C. This is made possible only by equalizing the flow of the vapors through the treating material and by a series of chambers, which facilitates the rapid and practically complete removal of the liquid polymers from the treating material as soon as they are formed, leaving the treating material active, and free to be contacted.

The direction of flow of the vapors through this treater is optional.

The apparatus in Fig. 1 may be so arranged and connected that when the treating material in one chamber becomes spent that chamber may be cut out or by-passed until emptied and recharged then put back into service in any position in the cycle as desired. Operation in this manner effects a saving in clay at the same time making a better product.

It is advantageous to operate the treating tower at such a temperature and pressure as will prevent the formation of partial condensation of the vapors. The presence of condensate and liquid polymers blocks the minute pores of the treating material and greatly reduces its efficiency.

This condensate may be avoided by operating the treating tower at a lower pressure than the vaporizer or the bubble tower. The vapors may be expanded adiabatically outside of the treating tower or directly into the top of said tower.

Another way of avoiding partial condensation is by heating the vapors before they enter the treating tower by means of a heat exchanger with hot oil or superheated steam, or by a secondary coil in a furnace.

The process of the present invention may be carried out under any desired pressure ranging from substantially atmospheric to relatively high superatmospheric pressures of several hundred pounds or more per square inch.

What I claim and desire to secure by Letters Patent is:

1. An apparatus for contacting vapors with solids, comprising a cylindrical elongated tank positioned about a horizontal axis, a plurality of treating chambers with a space maintained free of solids between the chambers, said treating chambers and vapor spaces being formed in the elongated tank by perforated partitions, the perforated plates being pervious to vapors and liquids and impervious to solids, means for equalizing the flow of the vapors through the treating material such as by setting the screen plates at such an angle that the dimension of the chambers in the direction of flow will increase from bottom to top, a port in the top of each chamber for filling, a port in the bottom of each chamber for removing the spent treating material, means for causing vapors to flow horizontally and alternately through the treating chambers and vapor spaces, means for collecting the liquid polymers in the various vapor spaces, and means for removing same from treater.

2. An apparatus for contacting vapors with solids comprising an elongated vessel having its principal axis disposed in a horizontal plane, an inlet in one end of said vessel and an outlet in the other end thereof for the passage of vapors therethrough, a series of chambers in said vessel for the retention of said solids, spaced each from the other, said chambers being wider at the top than at the bottom thereof to equalize the resistance to the flow of vapors therethrough.

3. An apparatus for contacting vapors with solids comprising an elongated vessel having its principal axis located horizontally, an inlet in one end of said vessel and an outlet in the other end thereof for the passage of vapors therethrough, a series of chambers in said vessel for the retention of said solids, spaced each from the other, said chambers being wider at the top than at the bottom thereof, and baffle plates located in the spaces between said chambers and so disposed therein as to direct vapors passing from one chamber to the next to the lower portion of said space thereby restraining said vapors from initially passing directly from the top part of one chamber to the top part of the next chamber through said space.

4. An apparatus for contacting vapors with solids comprising an elongated vessel having its principal axis disposed horizontally, a series of perforate partitions in said vessel forming chambers for the retention of said solids, said chambers being spaced each from the others, and a series of baffles extending partially across said vessel in the spaces between said chambers and arranged at an acute angle to the top of said partitions to provide a gradually decreasing space between said baffle and said partition thus producing a gradually increasing resistance to the upward flow of vapors in said spaces and adjacent said partitions.

HARRY E. DRENNAN.